(12) United States Patent
Wilton et al.

(10) Patent No.: US 11,108,803 B2
(45) Date of Patent: Aug. 31, 2021

(54) DETERMINING SECURITY VULNERABILITIES IN APPLICATION PROGRAMMING INTERFACES

(71) Applicant: Synopsys, Inc., Mountain View, CA (US)

(72) Inventors: Shane Wilton, Mountain View, CA (US); Benjamin D. Sedat, San Francisco, CA (US); Angel Irizarry, San Jose, CA (US); Michael Borohovski, Mountain View, CA (US); Ainsley K. Braun, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 65 days.

(21) Appl. No.: 15/447,108

(22) Filed: Mar. 1, 2017

(65) Prior Publication Data
US 2018/0255089 A1    Sep. 6, 2018

(51) Int. Cl.
*H04L 29/06* (2006.01)

(52) U.S. Cl.
CPC ...... *H04L 63/1433* (2013.01); *H04L 63/0281* (2013.01); *H04L 63/083* (2013.01); *H04L 63/0884* (2013.01); *H04L 2463/082* (2013.01)

(58) Field of Classification Search
CPC ............ H04L 63/1433; H04L 63/0281; H04L 63/083; H04L 63/0884; H04L 2463/082
(Continued)

(56) References Cited

U.S. PATENT DOCUMENTS

| 8,745,641 B1 | 6/2014 | Coker |
| 9,015,730 B1* | 4/2015 | Allen ...................... G06F 9/541 |
| | | 719/310 |

(Continued)

FOREIGN PATENT DOCUMENTS

| KR | 10-2010-0080044 A | 7/2010 |
| RU | 2446459 C1 | 3/2012 |

OTHER PUBLICATIONS

PCT International Search Report and Written Opinion for PCT/US17/65919, dated Mar. 7, 2018, 14 Pages.
(Continued)

*Primary Examiner* — Mohammad W Reza
*Assistant Examiner* — Moeen Khan
(74) *Attorney, Agent, or Firm* — Fenwick & West LLP (57) ABSTRACT

A security system scans application programming interfaces (APIs) to detect security vulnerabilities by receiving API documentation from a third-party system associated with the API and organizing it in an API specification that describes the hostname of the API and one or more endpoints of the API. For each of the endpoints, the API specification includes a uniform resource identifier, a method term, an input content type, an output content type (if applicable), authorization details, and any associated parameters or arguments. The security system performs an audit job for each combination of endpoints, potential security vulnerabilities, and (in some embodiments) authentication flows. In some embodiments, the security system is able to access portions of the API requiring authentication by using authentication flows received from the third-party system and detect security vulnerabilities related to authentication by manipulating the authentication units that make up the authentication flow.

18 Claims, 5 Drawing Sheets

(58) Field of Classification Search
USPC .............................................................. 726/7
See application file for complete search history.

(56) References Cited

U.S. PATENT DOCUMENTS

| | | | | |
|---|---|---|---|---|
| 9,154,479 | B1* | 10/2015 | Sethi | H04L 63/08 |
| 2008/0209567 | A1* | 8/2008 | Lockhart | G06F 11/3612 |
| | | | | 726/25 |
| 2008/0256638 | A1* | 10/2008 | Russ | G06F 21/577 |
| | | | | 726/25 |
| 2009/0158407 | A1* | 6/2009 | Nicodemus | H04L 63/20 |
| | | | | 726/6 |
| 2011/0173693 | A1 | 7/2011 | Wysopal et al. | |
| 2012/0110174 | A1* | 5/2012 | Wootton | G06F 21/564 |
| | | | | 709/224 |
| 2012/0222122 | A1* | 8/2012 | Das | G06F 21/577 |
| | | | | 726/25 |
| 2013/0061211 | A1 | 3/2013 | Rama et al. | |
| 2014/0109227 | A1* | 4/2014 | Kalman | G06F 21/577 |
| | | | | 726/25 |
| 2016/0301679 | A1 | 10/2016 | Mortimore, Jr. et al. | |
| 2017/0126654 | A1* | 5/2017 | Fu | H04L 9/0852 |
| 2017/0249462 | A1* | 8/2017 | Permeh | G06F 21/552 |
| 2018/0032314 | A1* | 2/2018 | Gorbaty | G06F 11/36 |

OTHER PUBLICATIONS

Swedish Patent and Registration Office, Office Action and Swedish Search Report, Swedish Patent Application No. 1951004-9, dated Sep. 1, 2020, 10 pages.
Russian Patent Office, Office Action, Russian Patent Application No. 2019128540, dated Mar. 25, 2021, nine pages.

\* cited by examiner

DETERMINING SECURITY VULNERABILITIES IN APPLICATION PROGRAMMING INTERFACES

BACKGROUND

This disclosure relates generally to security vulnerability detection, and more specifically to determining security vulnerabilities in application programming interfaces.

Web application vulnerability scanning is well-established and able to provide adequate security coverage for web applications by crawling them to discover all possible web elements and performing attacks to detect security vulnerabilities. However, application programming interfaces (APIs) are inherently different from web applications because they are not intended for human consumption. Instead, they are built to directly interact with other code or software, which does not require the human-clickable links and buttons that are found on web applications. To this effect, APIs are frequently made up of disconnected endpoints that respond to requests independently, a structure that generally does not provide mechanisms for programmatically crawling all of the endpoints or functionality provided by the API. Existing techniques for API vulnerability scanning rely on targeting a web application scanner at API endpoints despite being unable to programmatically discover input vectors and other endpoints. By ignoring the fundamental differences between web applications and APIs, these techniques are only able to provide a rudimentary level of security coverage.

Conventional techniques also fail to address issues related to authenticated access beyond form login or basic authentication. This level of authentication is sufficient for most web applications. However, APIs typically require more advanced authentication, such as complicated OAuth2 flows in combination with other access requirements, such as signatures or authorization headers. By not being able to describe or communicate these complex authentication flows, existing techniques are unable operate on APIs requiring those authentication flows.

Furthermore, existing solutions are designed for infrequent use (e.g., weekly to annually), with scans being days-long and requiring human interaction for scan initiation and result retrieval. This timescale is not compatible with the increasingly popular concept of continuous delivery, which can result in new software versions being released hundreds of times per day. Similarly, the manual nature of these techniques means that they are not able to be integrated into continuous security techniques that rely on real-time monitoring of security processes to respond to security threats and assess risk.

SUMMARY

A security system scans application programming interfaces (APIs) to detect security vulnerabilities. To do this, the security system receives API documentation from a third-party system associated with the API and organizes it in an API specification that describes the hostname of the API and one or more endpoints of the API. Alternatively, the security system may generate an API specification for the API without receiving API documentation by intercepting traffic between the API and an application that uses it. For each of the endpoints, the API specification includes a uniform resource identifier, a method, an input content type (if applicable), an output content type (if applicable), authorization details, and any associated parameters or arguments. For each parameter of an endpoint, the API specification includes the parameter's name, whether the parameter is required by the endpoint or optional, and the allowable data type(s) of its value, as well as an example valid value in one embodiment. The security system then performs an audit job for each combination of endpoints, potential security vulnerabilities, and (in some embodiments) authentication flows. The results of the audit jobs is compiled into a scan report noting the detected security vulnerabilities for the third-party system.

In some embodiments, the security system also receives authentication flows for the API with the API documentation. The security system provides a framework for an administrative user of the third-party system to describe the authentication flows in terms of multiple discrete authentication units offered by the security system. Each authentication unit performs an authentication operation, such as adding query parameters, adding headers, performing an OAuth2 handshake, retrieving a multi-factor authentication token, constructing a request signature, proxying a request through a proxy, or performing HTTP Basic authentication. The security system is then able to access portions of the API requiring authentication by using the authentication flow and detect security vulnerabilities related to authentication by manipulating the authentication units that make up the authentication flow.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System and Method for Scanning APIs

Figure 1:
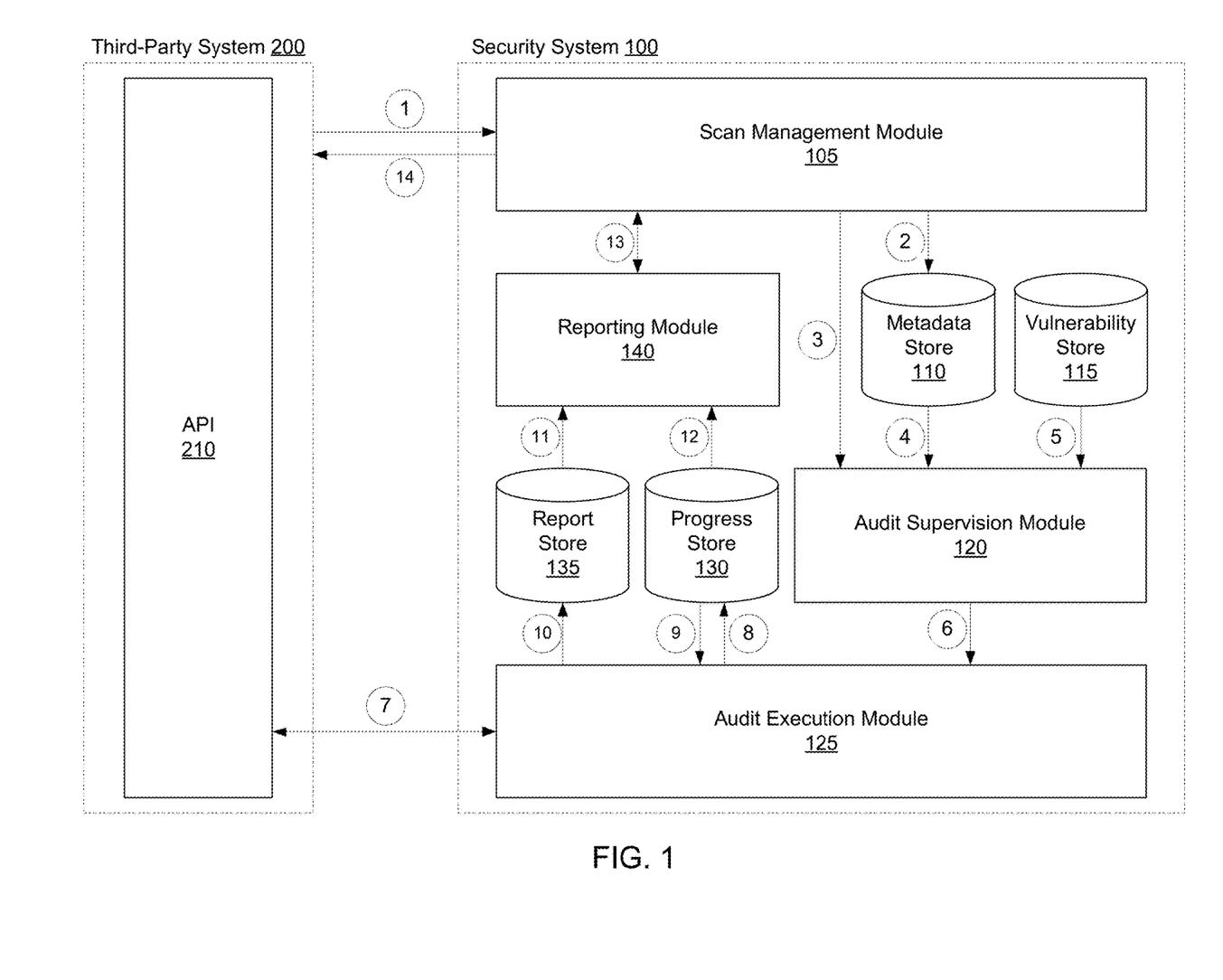
FIG. 1 is a block diagram illustrating a flow of information between a security system and a third-party system, according to one embodiment.

FIG. 1 illustrates a system architecture of a security system 100, according to one embodiment. The security system 100, explained in greater detail below, communicates with a third-party system 200 to perform a vulnerability scan on an API 210 of the third-party system 200. Though only a single third-party system 200 is shown, the security system 100 is able to communicate with multiple third-party systems 200 or APIs 210 concurrently, as discussed in conjunction with FIG. 2.

The third-party system 200 is made up of one or more servers that host the API 210 and is capable of transmitting data to and receiving data from the security system 200. The API 210 is made up of one or more endpoints that each specifies an addressable location that provides one or more services, such as performing a subroutine, or querying a resource. Endpoints provide connection points to the API 210 that allow other systems to access its functionality and can be expressed, for example, in terms of uniform resource identifiers (URIs). In some embodiments, the third-party system 200 communicates with the security system 100 via a network, which may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). All or some of the communication links of the network may be encrypted using any suitable technique or techniques. In other embodiments, the third-party system 200 may communicate with a local embodiment of the security system 100, such as a virtual machine.

The security system 100 includes a scan management module 105, a metadata store 110, a vulnerability store 115, an audit supervision module 120, an audit execution module 125, a progress store 130, a report store 135, and a reporting module 140. In other embodiments, the security system 100 may include additional, fewer, or different components for various applications. For example, the security system 100 may additionally include a web server that serves web pages and manages its connection to the network over which it communicates with the third-party system 200. Conventional components such as network interfaces, security functions, load balancers, failover servers, management and network operations consoles, and the like are not shown so as to not obscure the details of the system architecture.

The scan management module 105 primarily performs functions involving communication with the third-party system 200, such as gathering metadata about the API 210. The metadata includes documentation that exposes the functionality of the API 210 (referred to as "API documentation"), and a description of one or more authentication flows used to access the API 210. The API documentation describes the functionality of the API 210 in a computer-readable format, such as OpenAPI Specification, Swagger, RAML, or Blueprint. An API 210 may grant different permissions to different types of users (e.g., administrative users vs. general users), resulting in different authentication flows that give access to different features or functionality of the API 210. The types of users associated with the different authentication flows are referred to as "subjects." Describing authentication flows is further discussed in conjunction with FIGS. 4-5.

The scan management module 105 parses the API documentation received from the third-party system 200 and organizes that information into an API specification. The API specification describes the portions of the API documentation that are relevant to the scan and is organized in a format that other portions of the security system 100 can understand. The information included in the API specification is discussed in further detail in conjunction with the metadata store 110. In some embodiments, the API specification is in a custom format, while in other embodiments, the API specification is in an established format, such as the aforementioned computer-readable formats (i.e., OpenAPI Specification, Swagger . . . ). In one embodiment, the API specification is in the same format as the API documentation, and the scan management module 105 may simply use the API documentation as the API specification.

In some embodiments, the scan management module 105 generates an API specification on its own instead of receiving API documentation from the third-party system 200. The scan management module 105 may do this by crawling a web application that makes use of the API 210. During the crawling, the scan management module 105 intercepts the calls made by the web application (e.g., through a browser). Each intercepted call provides the scan management module 105 with information about the corresponding endpoint and method requested, as well as any headers and parameters passed to that endpoint. This provides enough information to allow the security system 100 to audit the endpoints and parameters that it is able to intercept. This interception technique can also be applied outside of API interactions with web applications. For example, the scan management module 105 can generate an API specification for a backend API used by a mobile application on a client device by recording traffic emanating from the client device during normal use, such as by a user interacting with the mobile application or by exercising functionality by automating inputs on the mobile application.

The scan management module 105 also manages scan reports provided to, and in some embodiments requested by, the third-party system 200. Scan reports are discussed in further detail in conjunction with the reporting module 140. In some embodiments, the scan management module 105 also generates a user interface (e.g., on a web page) that the third-party system 200 (or rather, administrators of the third-party system 200) can use to interact with the scan management module.

The metadata store 110 stores processed metadata about the API 210, such as the API specification and the description of the authentication flow(s). The API specification includes the hostname of the third-party system 200 providing the API 210, and one or more endpoints of the API 210. The endpoints themselves are uniform resource identifiers (URIs), such as uniform resource locators (URLs). For each endpoint, the API specification includes the associated URI, a method term, an input content type, an output content type (if applicable), authorization details, and any associated parameters or arguments. URIs for endpoints are commonly uniform resource locators (URLs). Authorization details may include proxy information, authentication type(s), or multi-factor authentication. The method is a term that is used to interact with the endpoint. For example, the method term is an HTTP verb (e.g., Get, Post, Put, Patch, Delete) for APIs based on HTTP. The input and output content types describe the expected input content types and expected output content types, such as JSON, XML, text, or HTML. Each parameter represents a possible value used in the endpoint. For each parameter of the endpoint, the API specification includes the parameter's name, whether the parameter is required by the endpoint or optional, and the allowable data type(s) of its value (e.g., string, positive, integer, floating point, array, Boolean, enumerated). For parameters that allow the enumerated (enum) type as a data type, the API specification also includes the set of all valid values (e.g., {bass, tenor, alto, soprano} or {440, 494, 523, 587, 659, 698, 784}). Additionally, the API specification may include an example valid value for the parameter. In some embodiments, the API specification contains different information depending on what is relevant to the API 210 being scanned. For example, an API specification for an API 210 that receives binary data may contain information about, e.g., the protocol buffers used to encode the binary data.

The vulnerability store 115 stores vulnerability-specific information that is used to perform individual audit jobs. Specifically, the vulnerability store 115 may include malicious test payloads (or instructions for how to construct them) to be used when auditing for a specific vulnerability. These vulnerabilities may include authentication leakage, authorization bypass, authentication bypass, buffer overflow, insufficient accept header validation, insufficient content type validation, insufficient type checking, NoSQL injection, reflected cross-site scripting (XSS), response splitting, structured query language (SQL) injection, verb tampering, missing security headers, XML external entity injection, and YAML injection.

The audit supervision module 120 determines the number and details of specific audits jobs that are to be performed for the scan, based on the API specification. The total number of audit jobs performed per scan is the Cartesian product of the number of endpoints in the API specification, the number of authentication flow(s) provided and the number of vulnerabilities being tested for. For example, if the API 210 lacks an authentication flow, the authentication leakage and bypass vulnerabilities will not be tested for. Each audit job may be represented as a triplet, such as {vulnerability, endpoint, subject}, that is passed to the audit execution module 125. In some embodiments, the audit jobs may be ordered based on priority.

The audit execution module 125 performs the individual audit jobs on the API 210. For each audit job, the audit execution module 125 generates a test payload meant to exploit the vulnerability and records its results in the report store 135. The audit execution module 125 also updates the statuses of the audit jobs in the progress store 130 as necessary. In some embodiments, the audit execution module 125 is embodied as a "worker pool," which is a collection of a finite number of processes. Each "worker process" in the worker pool only performs one audit job at a time. Once it completes that audit job, it receives another to perform, and so on. The worker pool structure limits resource consumption and the rate of the scan, as well as allows for distributing the audit jobs across different machines or networks. These capabilities provide powerful scaling capabilities with fine-grained tuning controls. Audit jobs are further discussed in conjunction with FIG. 3.

The progress store 130 is a database that records the status of each audit jobs in the scan. Specifically, the progress store indicates whether each audit job has not been started, is in progress, or has been completed. The progress store 130 may additionally indicate that the audit job has failed, as well as how many times it has failed.

The report store 135 is a database that stores the results of various audit jobs. The results may be binary, such as "no vulnerability found" or "vulnerability found" for each vulnerability tested. The results may additionally include specific details of the audit jobs, such as the test payload used and when it was performed. The results may further note that a particular audit job has failed the maximum number of times allowed in the scan.

The reporting module 140 generates and disseminates scan reports based on information from the progress store 130 and the report store 135. An example scan report may indicate which audit jobs have been completed, what their results were (including which vulnerabilities have been detected), and which audit jobs still have yet to be completed, or a subset thereof. The reporting module 140 may deliver the scan reports to a file on a local file system of the security system 100 or the third-party system 200, a remote paging service, or a GRC (Governance, Risk, and Compliance) solution, such as Lockpath. The reporting module 140 generates scan reports according to the requirements of the recipient.

The reporting module 140 can also indicate completion of a scan, which is when all audit jobs in the progress store 130 are either completed or have failed (so no work is in progress). In some embodiments, the reporting module 140 generates new scan reports whenever the progress store 130 and/or report store 135 receive new information, resulting in real-time delivery of scan information.

FIG. 1 also illustrates a flow of information between the security system 100 and the third-party system 200, according to one embodiment. The flow of information in FIG. 1 is described by the following steps (1) through (14). In step (1), the third-party system 200 provides the scan management module 105 with pertinent information about the API 210, such as the API documentation and the description(s) of its authentication flow(s). The scan management module 105 organizes (i.e., by parsing) the API documentation into the API specification, which is sent to the metadata store 110 in step (2). The scan management module 105 also sends scan information (such as an initiation to start the scan) to the audit supervision module in step (3). In steps (4) and (5), the audit supervision module 120 retrieves the API specification from the metadata store 110 and information about the vulnerabilities that are going to be tested for from the vulnerability store 115, respectively. Using the endpoint information in the API specification, the provided authentication flow(s) and retrieved vulnerability information, the audit supervision module 120 generates the individual audit jobs that the security system 100 will perform and sends them to the audit execution module 125 in step (6). The audit execution module 125 then performs the audit jobs on the API 210 in step (7).

While the audit jobs are being performed, the audit execution module 125 updates the progress store 130 with the status of the audit jobs in step (8), and retrieves information about which tests need to be performed again in step (9). The audit execution module 125 also stores the results of the audit jobs in the report store 135 in step (10) as the audit jobs are being completed. The reporting module 140 generates scan reports based on information retrieved from the report store 135 in step (11) and the progress store 130 in step (12). The reporting module 140 sends the generated scan reports to the scan management module 105 in step (13), sometimes in response to a prompt from the scan management module 105 requesting the scan report. The scan report is then delivered to the third-party system 200 by the scan management module 105 in step (14).

Figure 2:
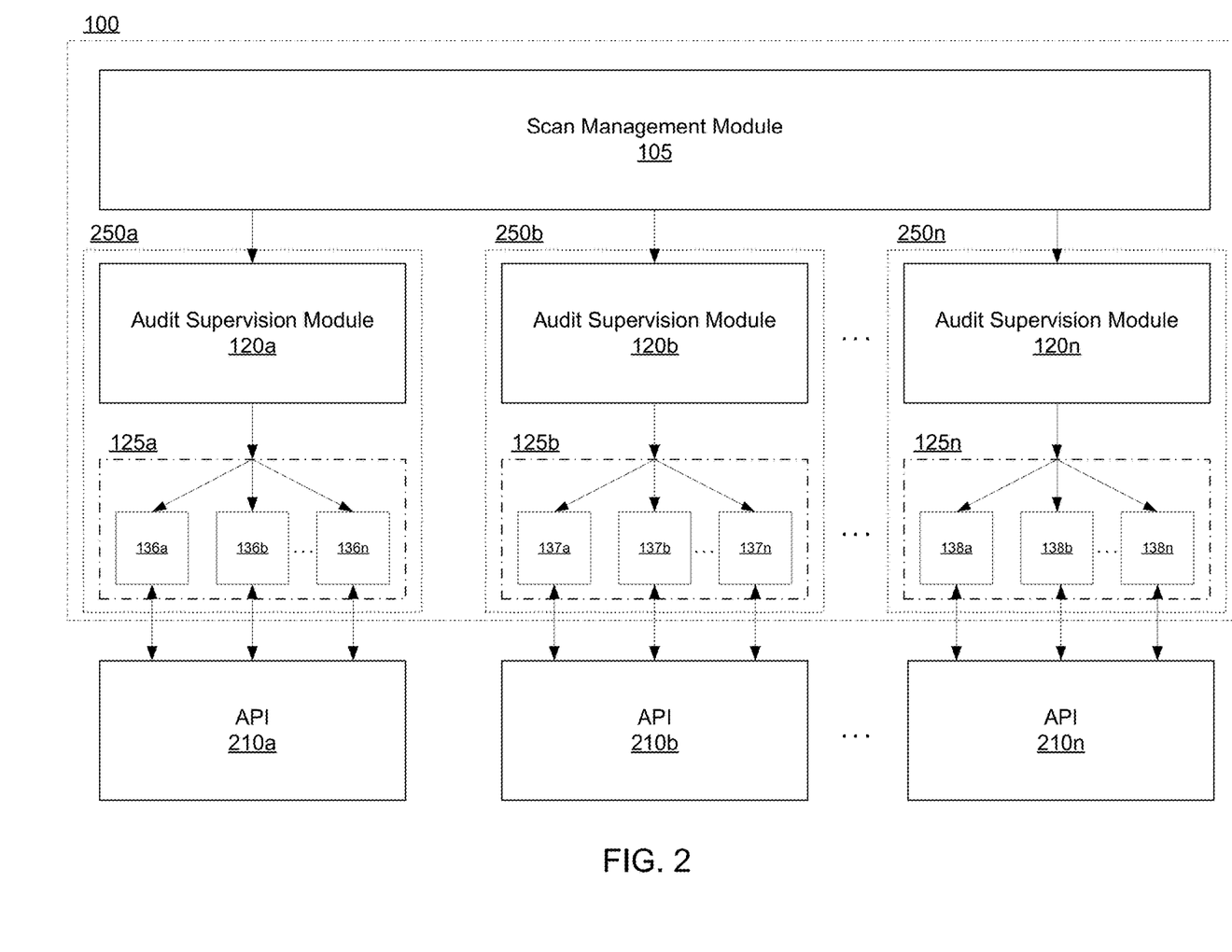
FIG. 2 is a block diagram illustrating a security system in communication with multiple APIs, according to one embodiment.

FIG. 2 is a block diagram of the security system 100 communicating with multiple APIs 220a-n, according to one embodiment. In some embodiments, the security system 100 runs multiple scans in parallel. The scan management module 105 creates "scan tasks" 250a-n that each correspond to a scan being performed on an API 210a-n, respectively. Each scan task is managed independently to some extent. For example, each scan task can be associated with its own (or its own sub-portions of the) audit supervision module 120a-n and audit execution module 125a-n. Other modules described in conjunction in FIG. 1 may be similarly allocated. Each audit execution module 125a-n includes a finite number of worker processes 136a-n, 137a-n, and 138a-n.

The number of worker processes for each scan task 250*a-n* may be determined based on computing requirements and/or constraints of the security system 100 and/or the third-party systems 200 corresponding to the APIs 210*a-n*. For example, the third-party system 200 may specify a maximum bandwidth that it can handle, and the security system 100 may select a number of worker processes to perform the scan such that they would not be able to collectively exceed the specified maximum bandwidth.

In some embodiments, a scan of a single API 210 may be split into multiple scan tasks. For example, a previously scanned API 210 may have had some new endpoint added since the last scan. The new endpoints may need to be scanned for more (or different) vulnerabilities than the endpoints that were previously scanned, so it may be the most efficient to separate the API 210 into the endpoints that were previously scanned and are now only being scanned for several new vulnerabilities and the new endpoints that are being scanned for all possible vulnerabilities.

Running these scan tasks 250*a-c* in parallel is also conducive to (but not required for) implementing the security system 100 as a distributed network such that different scan tasks are run on different servers within the same network or on different networks entirely. Similarly, worker processes may be run on different servers or networks. This distributed network implementation aids in fault tolerance by offering robustness in the case of a portion of the infrastructure of the security system 100 is taken down (e.g., as a result of hardware error, software error, or a targeted hacking attempt).

When implemented as a distributed network, the security system 100 may use "leaky bucket" or "token bucket" algorithms to control the flow of requests to the API 210 because limiting the number of threads allowed to make requests is ineffective. These algorithms allow the security system 100 to make sure that the rate of outgoing requests fulfills any bandwidth requirements specified by the third-party system 200.

Method for Scanning API Endpoints

Figure 3:
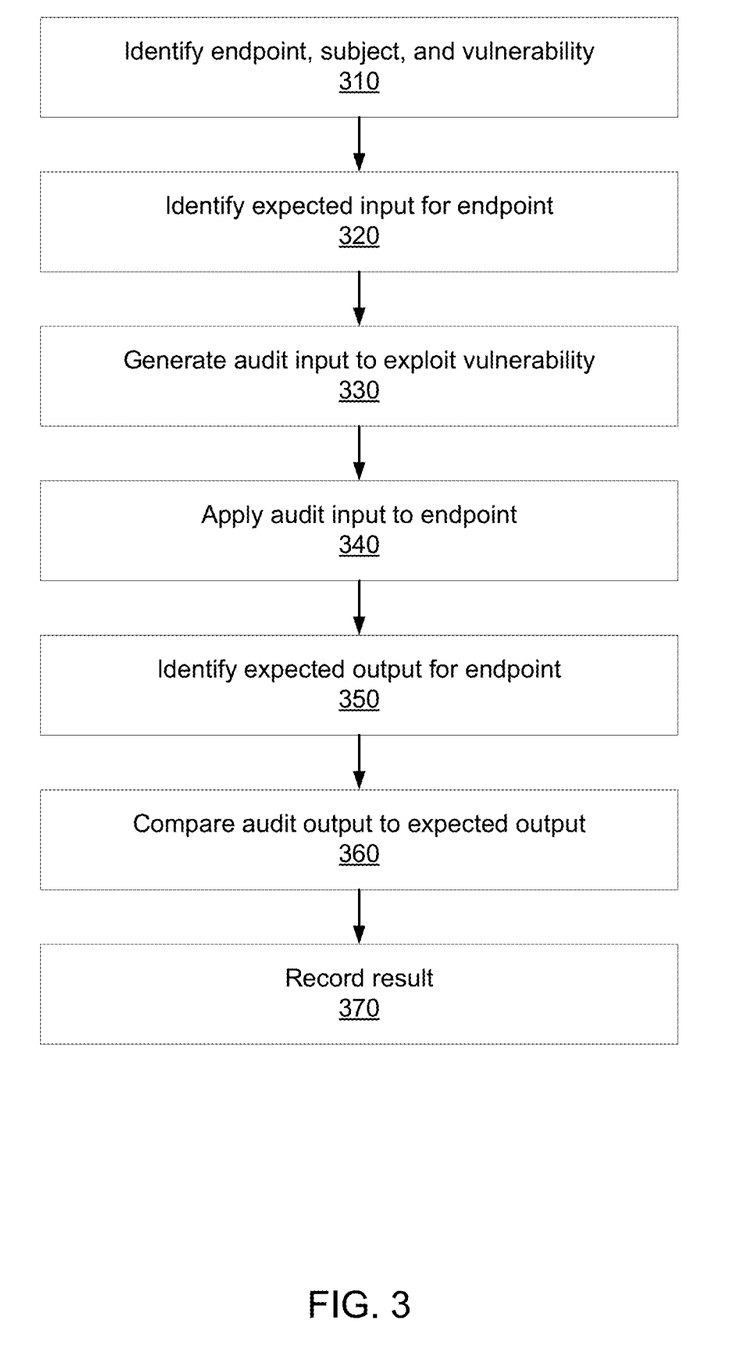
FIG. 3 is a flowchart illustrating a method for performing a single audit, according to one embodiment.

FIG. 3 is a flowchart illustrating a method 300 for performing a single audit job, according to one embodiment. The steps of method 300 do not necessarily need to be performed in the order described and may include fewer, additional or different steps in different embodiments.

First, the security system 100 identifies 310 the endpoint, subject, and vulnerability for the audit job. These may all be identified together by a {vulnerability, endpoint, subject} triplet. The security system 100 then identifies 320 the expected input for the endpoint, which can be used to format the test payload correctly, or exploit input-related vulnerabilities. The security system 100 generates 330 an audit input (e.g., based on a test payload) that exploits the identified vulnerability. The generated 330 audit input takes the form of a valid request (e.g., by having the formatting and content type that the endpoint is expecting) but substitutes the test payload into one of its fields. In some embodiments, the security system 100 addresses differences in formatting between endpoints or APIs 210 by generating a generic payload for that vulnerability and then translating it into the correct format. In this way, the security system 100 is able to establish a single test for a vulnerability that can be used on endpoints using different transport protocols (e.g., JSON, XML, and SOAP).

The security system 100 applies 340 the audit input to the endpoint and receives an audit output. After identifying 350 the expected output for the endpoint, the security system 100 compares 360 the audit output to the expected output. In many cases, the expected output is a lack of access to the functionality of the endpoint and/or an error. If the audit output does not match the expected output, the audit job has uncovered a vulnerability. Finally, the security system 100 records 370 its result (e.g., vulnerability found, no vulnerability found, test failed). In some embodiments, an audit job includes multiple payloads that each cater to a different parameter of the endpoint. In this case, the security system 100 may only record a single result (e.g., a vulnerability is noted if any of the audit inputs do not have the expected outcome) or it may record separate results for each parameter (e.g., the vulnerability is only noted for the parameter associated with the audit input that did not have the expected outcome).

In an example audit job for a reflected XSS vulnerability, the security system 100 looks for endpoints of the API 210 that can be coerced into responding with attacker-controlled data that may be interpreted as HTML by a browser. The security system 100 iterates through each of an endpoint's input vectors (e.g., query parameters, body parameters, path parameters), and audits each one. During each auditing pass, the security system 100 constructs a valid request for that endpoint, substituting the value of the input vector being audited with a cross-site scripting payload. The security system 100 analyzes the response from the API 210 to determine whether further auditing needs to be performed. If the response's content-type is "text/html," then the response will be interpreted as HTML by a browser, and the endpoint may be vulnerable to cross-site scripting. If the response's content-type is not specified and the response does not contain the header "x-content-type-options" with a value of "nosniff," then the browser can be coerced into sniffing the response as HTML, and the endpoint may similarly be vulnerable to cross-site scripting. In both of these cases, the security system 100 checks whether the cross-site-scripting payload appears anywhere within the response body. If it does, the security system 100 notes a reflected XSS error for this endpoint.

Describing and Auditing Authentication Flows

Authentication flows are conventionally treated like black box operations—an unauthenticated request goes in, and an authenticated request comes out. However, the security system 100 provides users with a framework to describe authentication flows in terms of smaller authentication operations (referred to as "authentication units"). This framework allows the security system 100 to analyze authentication-related vulnerabilities in greater detail and more easily accommodate different authentication flows.

Figure 4:
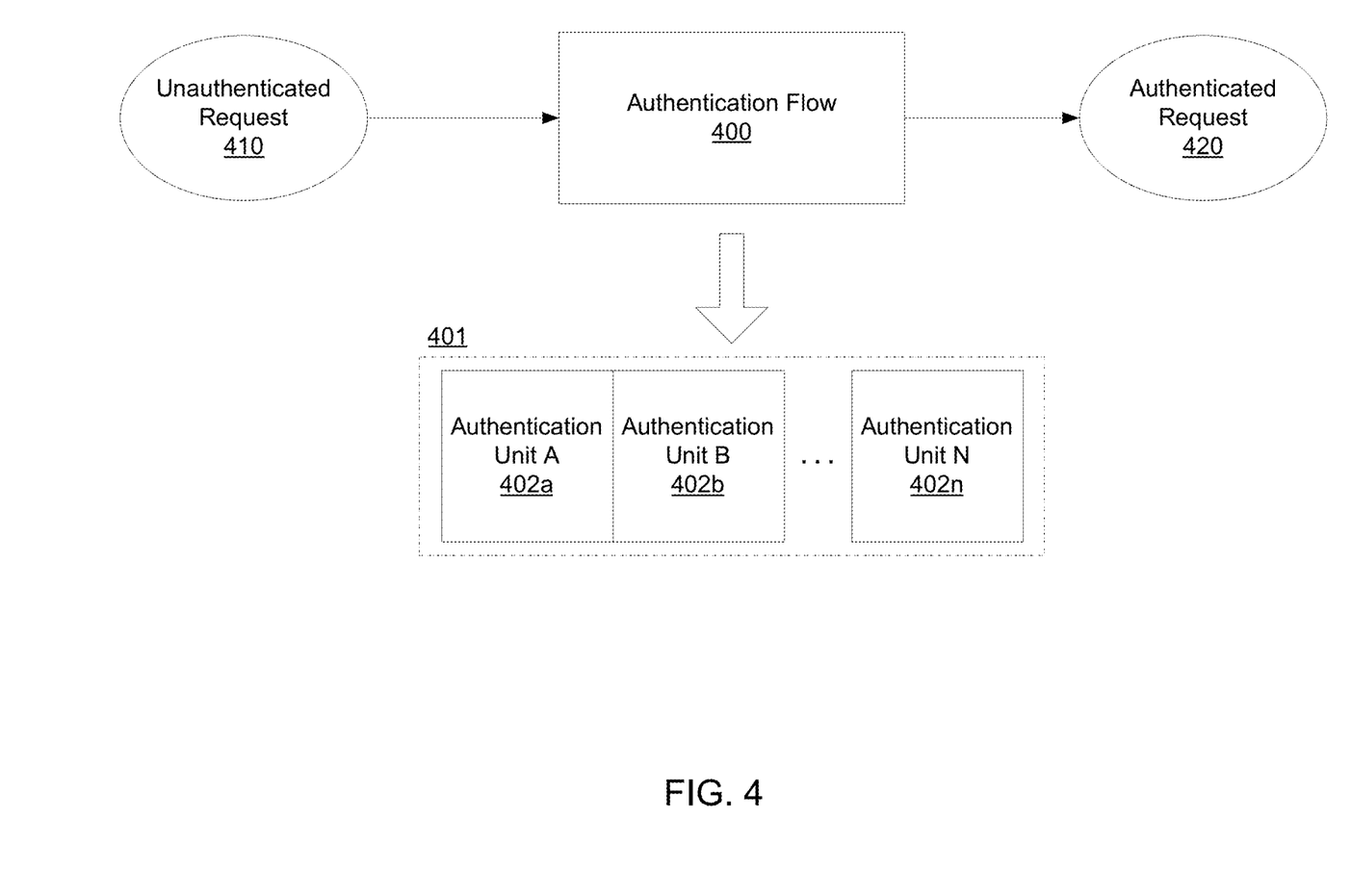
FIG. 4 is a block diagram illustrating an authentication flow of an endpoint of an API, according to one embodiment.

FIG. 4 is a block diagram illustrating an authentication flow 400 of an API 210 and its associated authentication units 402*a-n*, according to one embodiment. The authentication flow 400 receives an unauthenticated request 410 and transforms it into an authenticated request 420 that is able to access the functionality of the associated endpoint. A user providing the authentication flow 400 selects from among a list of predefined authentication units to select authentication units 402*a-n* that together represent the authentication flow 400.

Each authentication unit receives an input request and outputs a modified request, such that the modified request output by the last authentication unit in the series is a valid authenticated request 420. The authentication units may include adding query parameters, adding headers, performing an OAuth2 handshake (using implicit, client credentials, password, or authorization code grant types), retrieving a multi-factor authentication token, constructing a request signature, proxying a request through a proxy, and performing basic authentication. In some embodiments, the authentication units may be able to retrieve information from external systems (e.g., SMS messages, emails) in order to perform two-factor authentication. The security system 100 may additionally allow the user to specify and add custom authentication units representing functions not already represented by the available authentication units. By describing the authentication flow 400 in terms of a series of authentication units 402a-n, the security system 100 is able to perform audit jobs that target particular aspects of the authentication flow 400, rather than just the targeting the authentication flow 400 as a whole.

Figure 5:
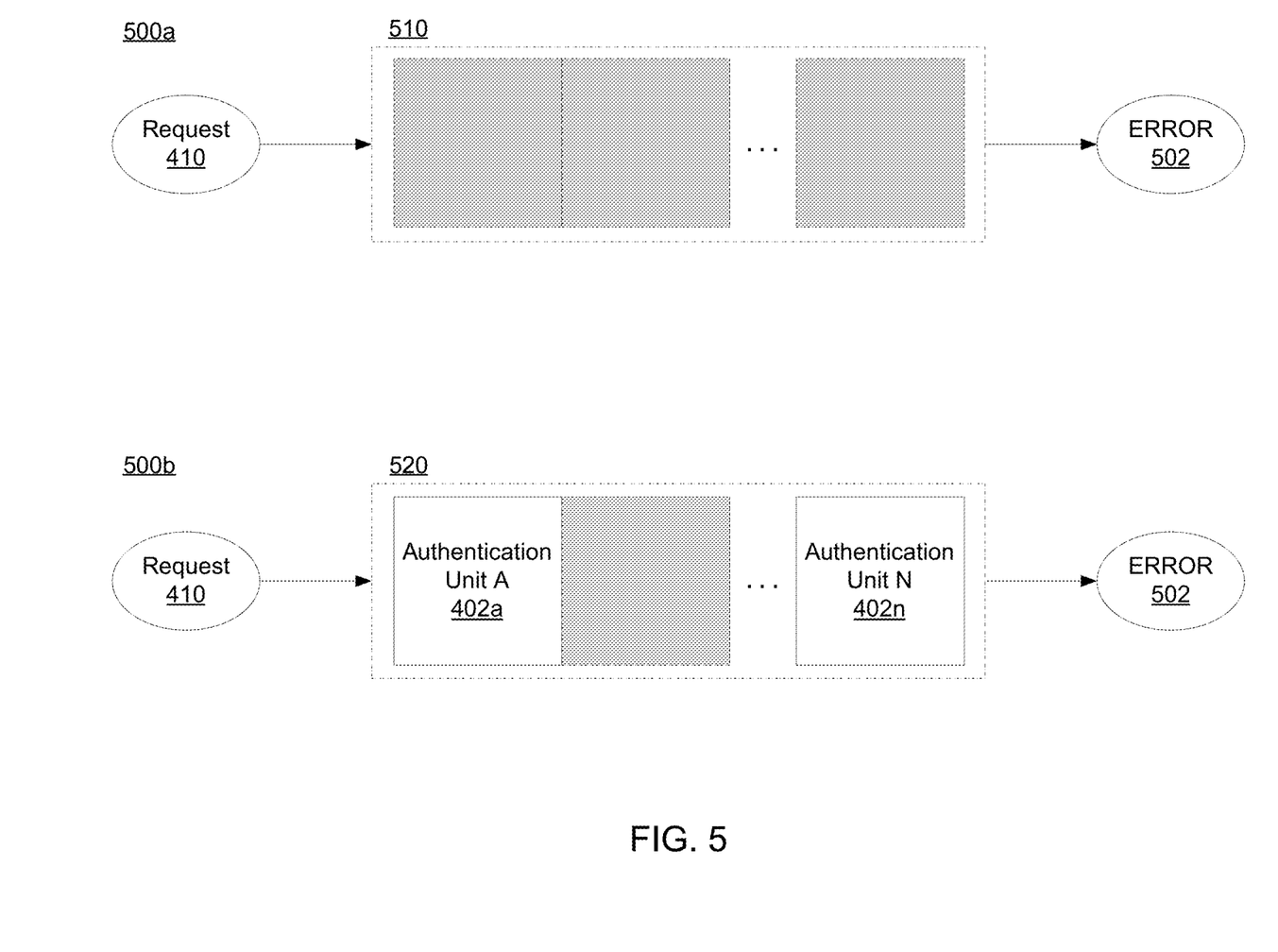
FIG. 5 is a block diagram illustrating several examples of audits that can be performed to expose authentication vulnerabilities, according to one embodiment.

FIG. 5 illustrates several example audit jobs 500a-c that can be performed to expose authentication vulnerabilities, according to one embodiment. Example audit job 500a removes all of the authentication units 402a-n from the authentication flow 400 to create a modified authentication flow 510. When the security system 100 inputs an unauthenticated request 410 into the modified authentication flow 510, it expects the output to be an error 502 that bars access to the associated functionality of the API 210. If that is not the case (i.e., the unauthenticated request 410 is able to access the endpoint functionality), the security system 100 logs an authentication bypass vulnerability.

Example audit job 500a illustrates an extreme example of an authentication bypass vulnerability. However, example audit job 500b uses the advantages of the abovementioned framework for describing authentication flows to catch more easily missed authentication bypass vulnerabilities. Example audit job 500b removes a single authentication unit 402b from the authentication flow 400 to create a modified authentication flow 520. When the security system 100 inputs the unauthenticated request 410 into the modified authentication flow 520, it similarly expects an error 502 that bars access to the associated functionality of the API 210 and logs an authentication bypass vulnerability if it is able to access the functionality. This type of authentication bypass vulnerability is one that would be missed if the security system 100 did not have the authentication flow 400 described in terms of authentication units 402a-n. Example audit job 500b also allows the security system 100 to pinpoint the source of the vulnerability. For example, if the security system 100 also performs audit jobs where it removes just one of authentication units 402a-n, and example audit job 500b is the only audit job that successfully accesses the associated functionality, the security system 100 can confidently indicate that there is a problem with authentication unit 402b that leads to the authentication bypass vulnerability. The security system 100 may perform audit jobs for all combinations of the authentication units 402a-n, and all permutations of the authentication units 402a-n if the authentication flow requires that the operations be performed in a certain order.

Though describing and auditing authentication flows is discussed above in terms of APIs 210, this description framework and auditing technique can also be applied to other targets involving authentication, such as complicated authentication flows for web applications.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method performed by a computer system for automating detection of security vulnerabilities of an application programming interface (API), the method comprising:
   receiving information about an API of a third-party system;
   receiving one or more authentication flows for the API;
   generating an API specification based on the received information, the API specification describing one or more API endpoints of the API, wherein a description of an API endpoint comprises a specified addressable location that provides access to one or more of services associated with the API, a method term that indicates a type of interaction with the API endpoint, and a set of input parameters that indicates the data types accepted as input by the API endpoint;

for each of the one or more API endpoints described in the API specification:
  for each of the one or more authentication flows for the API:
    determining, based on information about the authentication flow and the API endpoint in the API specification, one or more potential security vulnerabilities of the API endpoint;
    for each of the determined one or more potential security vulnerabilities of the API endpoint, performing a first audit job on the API endpoint to determine an indication of whether the API endpoint is vulnerable to the potential security vulnerability and performing a second audit job on the authentication flow to determine an indication of whether the authentication flow is vulnerable to the potential security vulnerability, wherein performing the second audit job includes modifying the authentication flow based on the potential security vulnerability by removing one or more authentication units and testing the modified authentication flow against the potential security vulnerability by receiving an unauthenticated request; and
    recording results of the first audit job and the second audit jobs performed;
generating a scan report for the API based on the recorded results; and
sending the scan report to the third-party system.

2. The method of claim 1, wherein performing the first audit job on the API endpoint comprises:
generating a test payload to exploit the potential security vulnerability for the API endpoint;
determining an expected output of the API endpoint for the test payload;
applying the test payload to the API endpoint;
comparing an output of the API endpoint responsive to application of the test payload to the expected output; and
determining a result of the audit job based on the comparison.

3. The method of claim 2, wherein the result is an indication that the potential security vulnerability is present if the output of the API endpoint does not match the expected output.

4. The method of claim 1, wherein receiving the one or more authentication flows comprises:
receiving a selection of one or more authentication units that can be combined to produce each of the one or more authentication flows.

5. The method of claim 4, wherein at least one of the one or more authentication units perform one or more of: adding query parameters, adding headers, performing an OAuth2 handshake, retrieving a multi-factor authentication token, constructing a request signature, proxying a request through a proxy, and performing basic authentication.

6. The method of claim 1, wherein at least one of the one or more potential security vulnerabilities is an authentication bypass vulnerability.

7. The method of claim 1, wherein at least one of the one or more potential security vulnerabilities is an authentication leakage vulnerability.

8. A non-transitory computer-readable medium comprising instructions that when executed by a processor cause the processor to perform steps for automating detection of security vulnerabilities of an application programming interface (API), the steps comprising:
receiving information about an API of a third-party system;
receiving one or more one authentication flows for the API;
generating an API specification based on the received information, the API specification describing one or more API endpoints of the API, wherein a description of an API endpoint comprises a specified addressable location that provides access to one or more of services associated with the API, a method term that indicates a type of interaction with the API endpoint, and a set of input parameters that indicates the data types accepted as input by the API endpoint;
for each of the one or more API endpoints described in the API specification:
  for each of the one or more authentication flows for the API:
    determining, based on information about the authentication flow and the API endpoint in the API specification, one or more potential security vulnerabilities of the API endpoint;
    for each of the determined one or more potential security vulnerabilities of the API endpoint, performing a first audit job on the API endpoint to determine an indication of whether the API endpoint is vulnerable to the potential security vulnerability and performing a second audit job on the authentication flow to determine an indication of whether the authentication flow is vulnerable to the potential security vulnerability, wherein performing the second audit job includes modifying the authentication flow based on the potential security vulnerability by removing one or more authentication units and testing the modified authentication flow against the potential security vulnerability by receiving an unauthenticated request; and
    recording results of the first and the second audit jobs performed;
generating a scan report for the API based on the recorded results; and
sending the scan report to the third-party system.

9. The non-transitory computer-readable medium of claim 8, wherein performing the first audit job on the API endpoint comprises:
generating a test payload to exploit the potential security vulnerability for the API endpoint;
determining an expected output of the API endpoint for the test payload;
applying the test payload to the API endpoint;
comparing an output of the API endpoint responsive to application of the test payload to the expected output; and
determining a result of the audit job based on the comparison.

10. The non-transitory computer-readable medium of claim 9, wherein the result is an indication that the potential security vulnerability is present if the output of the API endpoint does not match the expected output.

11. The non-transitory computer-readable medium of claim 8, wherein receiving the one or more authentication flows comprises:
receiving a selection of one or more authentication units that can be combined to produce each of the one or more authentication flows.

12. The non-transitory computer-readable medium of claim 11, wherein at least one of the one or more authentication units perform one or more of: adding query parameters, adding headers, performing an OAuth2 handshake, retrieving a multi-factor authentication token, constructing a request signature, proxying a request through a proxy, and performing basic authentication.

13. The non-transitory computer-readable medium of claim 8, wherein at least one of the one or more potential security vulnerabilities is an authentication bypass vulnerability.

14. The non-transitory computer-readable medium of claim 8, wherein at least one of the one or more potential security vulnerabilities is an authentication leakage vulnerability.

15. The method of claim 1, wherein receiving information about an API of a third party system comprises receiving documentation for the API.

16. The method of claim 1, wherein receiving information about an API of a third party system comprises intercepting calls made by an application interacting with the API.

17. The method of claim 8, wherein receiving information about an API of a third party system comprises receiving documentation for the API.

18. The method of claim 8, wherein receiving information about an API of a third party system comprises intercepting calls made by an application interacting with the API.

* * * * *